United States Patent [19]

Fischer et al.

[11] Patent Number: 4,469,725
[45] Date of Patent: Sep. 4, 1984

[54] IDENTIFICATION CARD

[75] Inventors: Paul Fischer, Uitikon/Waldegg; Etienne Ponato, Wallisellen, both of Switzerland

[73] Assignee: FIS Organisation AG, Zurich, Switzerland

[21] Appl. No.: 417,880

[22] Filed: Sep. 14, 1982

[51] Int. Cl.³ .......................... B32B 3/30; B32B 27/08
[52] U.S. Cl. ...................................... 428/13; 156/209; 283/72; 283/74; 283/109; 283/904; 428/161; 428/172; 428/916
[58] Field of Search ............... 428/172, 203, 204, 205, 428/161, 13, 916; 283/72, 74, 75, 109, 904; 427/7; 40/2 R; 156/209, 293, 297

[56] References Cited
U.S. PATENT DOCUMENTS

| 3,511,181 | 5/1970 | McGiffen et al. | 283/98 |
| 3,930,924 | 1/1976 | Oka et al. | 427/7 |
| 4,006,050 | 2/1977 | Hurst et al. | 428/916 |
| 4,298,217 | 11/1981 | Moraw et al. | 283/109 |

Primary Examiner—Paul J. Thibodeau
Attorney, Agent, or Firm—Oblon, Fisher, Spivak, McClelland & Maier

[57] ABSTRACT

A monolithic laminate identification card which contains at least two layers (26, 27) with different optical permeability or color. The adjoining joinable surfaces of these layers are provided with complementary, interlocking embossed and debossed formations (21, 22). Under transmitted light a sign or image corresponding to these embossed and debossed formations can be seen that has a different brightness or color from the rest of the card (25).

11 Claims, 5 Drawing Figures

IDENTIFICATION CARD

BACKGROUND OF THE INVENTION

1. Field of the Invention

The present invention concerns an identification card with at least two plastic layers joined into a one-piece layer.

2. Description of the Prior Art

Identification cards of the kind described are used especially for personal identification and/or as credit cards. The simplest type of these cards contain directly readable or machine readable, imprinted or impressed alphanumerical characters or codes respectively. In order to discourage as much as possible the misuse of personal identity cards, the one-piece laminate of such cards contains, for example, an additional layer that can be used as a frame for an inserted photograph or to imprint the necessary data, and, in order to make it more difficult to copy machine readable cards, it is known to place the layer that contains the machine readable data between two layers that do not transmit ambient light.

In order to improve the protection against forgery of directly readable cards even further, it is preferred to insert between two transparent plastic layers an equally sized paper layer that contains an imprinted guilloche in one part and a translucent part with a water mark that can be seen with transmitted light.

As practical experience has shown, the card with inserted paper layer has some considerable disadvantages. The adhesion of the fibres in the fibre joints of the paper is less than the adhesion to the adjoining plastic layers, which causes the fibre joints to be weakened by repeated bending which is unavoidable with frequent use.

Furthermore, the paper absorbs moisture and swells which can lead to splitting of the card along the edge of the paper layer.

SUMMARY OF THE INVENTION

Therefore, the current invention is based on solving the problem of creating an identification card that provides better protection from forgery without reducing its durability.

According to the invention, this problem is solved by an identification card of the type described at the beginning, characterized by the fact that at least two plastic layers contain different optical properties in order to create a sign or image that is visible in transmitted light and includes complementary, embossed and debossed formations on their mutually joint surfaces.

The sign or image made visible by transmitted light on the new identification card is comparable to the water mark of a paper layer. Compared to the known cards described above, that contain a water mark bearing paper layer the new identification card has the advantage that it consists only of plastic layers that have been joined into a monolithic laminate which means that, even after heavy use and the influence of mechanical forces and/or humidity, no substantial wear and tear and, especially, no separation of individual layers can be determined.

For a first preferred embodiment of the new identification card two plastic layers are used to create image visible in transmitted light, one of the layers being transparent and the other translucent, whereby a sign or image is created by areas of different brightness.

For a second preferred type of new identification card two plastic layers are used to create a sign or image visible by transmitted light, at least one of which is colored and translucent, whereby a sign or image is created by areas of different color intensity or different colors respectively.

A preferred procedure for the manufacture of the new identification card is characterized by the fact that, in order to get a form-locking joint of the complimentary embossed and debossed formations, the two plastic layers are provided with guide ways and that devices are used for the forming of the embossed and debossed formations as well as for the joining of the plastic layers that have guide installations suitable to cooperate with the guide ways.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

The size relationships to the Figures are drawn neither in scale nor proportional to the actual measurements, but were chosen arbitrarily for a clear representation.

The conventional term plastic is not clearly defined and includes modified natural products and synthetic materials with the exclusion of rubber and chemical fibres. As definition for the present invention and in the following description the term plastic is used for polymer compounds and especially for typical thermoplastics. To those belong half and fully synthetic non cross-linked polymers that form films, which can possibly by cross-linked by further treatment, as, for example, poly alkylenes including copolymers, as, for example, polyvinylchloride, thermoplastic polyester and cellulose derivatives. Preferred polymers are fusible and can be soaked and dissolved in organic solvents but are, as a rule, insoluble in water. The polymer compounds may contain additives such as softeners, stabilizers, dyes, etc.

Figure 1A:
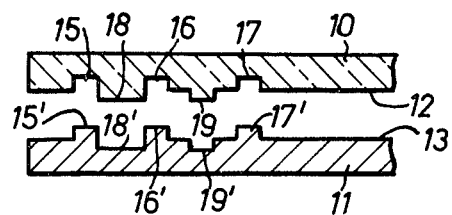
FIG. 1a to 1c are schematic representations of the assembly of a sign or image that is visible in transmitted light with the help of two plastic layers with different optical properties and complementary embossed and debossed formations.
Figure 1B:
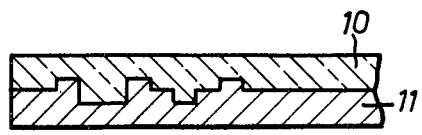
Figure 1C:
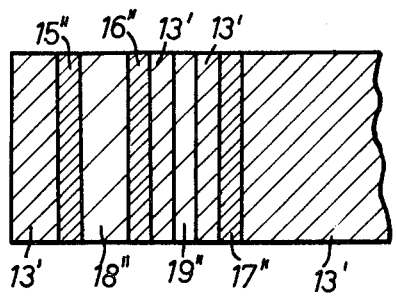

In FIGS. 1a to 1c is schematically shows the manner in which a sign or image that can be visible in transmitted light is assembled, using the cooperation of two plastic layers with different optical properties and complementary embossed and debossed formation. For this purpose it is assumed that one of the plastic layers 10 consists of plastic that is transparent to the human eye, and the other plastic layer 11 consists of plastic that is translucent. Furthermore, one of the surfaces 12 of the transparent plastic layer 10 has been provided with embossed and debossed formations that, in order to simplify the Figure, are shown as straight line shapes of equal width with practically vertical sides and equal height or depth compared to the unshaped surface. One surface of the translucent plastic layer 13 has also embossed and debossed formations that are complementary to those in the transparent plastic layer 10, i.e. the indentations 15, 16 and 17 and the elevations 18, 19 in the surface 12 of the transparent plastic layer 10 correspond to the elevations 15', 16' and 17' and indentations 18' and 19' in surface 13 of the translucent plastic layer 11.

When the two plastic layers with the embossed and debossed formations on their mutual surfaces are put together in such a way that the elevations of one cooperatively engage with the indentations in the other layer, a two part plastic body is formed with one transparent and one translucent part, as shown in FIG. 1b. The transparency characteristic of this body is influenced by the thickness of the translucent layer 11, whereby the brightness design shown in FIG. 1c appears. This design contains areas 13' with a medium brightness value that correspond to the unshaped areas of surface 13 of the translucent layer 11, and strips 15", 16", 17" that are darker then the areas 13' and correspond to elevations 15', 16', 17' on the surface 13, and stripes 18", 19" that are lighter than the areas 13' and correspond to the indentations 18', 19' in the surface 13.

As any expert knows, there are many possible methods of making translucent plastic. For this invention it is not important how the translucent plastic was made, it is only important that the translucence depends on the thickness of the layer. For this reason it is also possible to use - instead of the transparent and translucent layers as described - two translucent layers with different translucence or transmitted light characteristics. Furthermore, it is possible, to use - instead of a transparent and a colorless or milky white translucent plastic layer - a colorless transparent and a dyed translucent, or two differently dyed plastic layers, at least one of which has to be translucent.

Figure 2A:
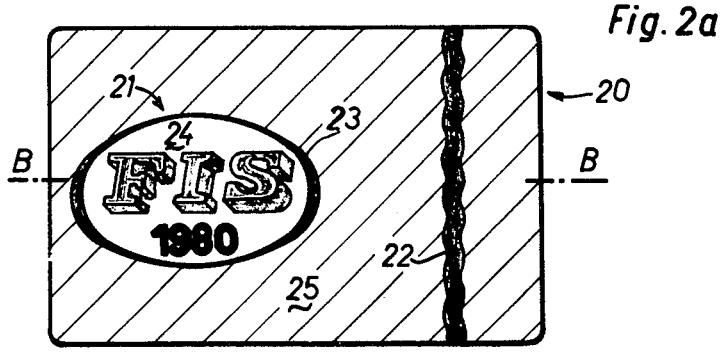
FIG. 2a and 2b show a top view and schematic cross sectional view through one type of the new identification card.

FIG. 2a shows the top view of an identification card 20 with a sign 21, visible in transmitted light and a wavy stripe 22, also visible under transmitted light. The sign or image 21 consists of an oval frame 23 enclosing a field 24, in which three letters and the number of the year are arranged. The frame 23, the letters, the number as well as the strip 22 appear darker then the rest of the card 25 under transmitted light. The area around the sign 24, enclosed by the frame and the white outlines of the letters appear lighter then the rest of the card 25 under transmitted light, which is indicated by crosshatching of the card area.

Figure 2B:
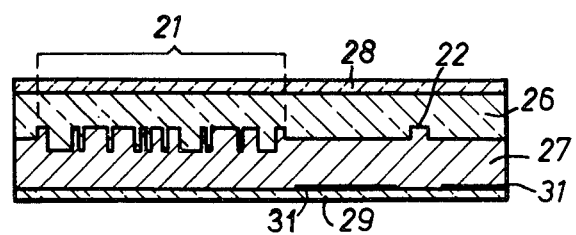

FIG. 2b shows, schematically, the cross section through the identification card according to FIG. 2a, along the line B—B. The card contains a first transparent internal layer 26 and a second translucent internal layer 27 as well as a first and second transparent outer coating 28 and 29. The two thin outer coatings 28, 29 consist of a relatively hard and mar-proof material and are designed to protect the two thicker inner layers 26, 27 that are relatively soft so that they can be shaped more easily. The transparent and translucent inside layers 26, 27 have, in the area of the sign 21 and the stripe 22, complementary embossed and debossed formations that increase, or decrease, as the case may be, the thickness of the translucent inside layer, which is the reason that the sign 21, visible under transmitted light, consists of areas that are either lighter or darker then the rest of the card 25. The outer surface of the translucent inside layer 27 that adjoins the outer coating 29 is imprinted with a guilloche 31 in the area outside of the sign 21 and stripe 22 that are visible transmitted light. The layers 26, 27 and coating foils 28, 29 are joined together into a monolithic laminate flexible identification card.

It is understood that the new identification card can also be made with only two layers or with more than the described two layers and two coating foils. The latter makes it possible to build into the card, in similar fashion as was the case with the conventional identification cards, an added photo or a signature area or even machine readable information.

As any expert will recognize immediately, the most important step during the manufacture of the new identification card is the form-locking or interlocking alignment of the embossed and debossed formation, especially before the joining of the two inside layers. In order to achieve this form-locking or interlocking alignment it is preferred that special guide means as described hereafter are used during manufacturing of the embossed and debossed formations, as well as for the joining of the layers.

To manufacture the new identification card, it is necessary to first cut the transparent and the translucent inside layers and the two coating foils. The cut pieces are larger than the card to be made to form a border of about 1 cm width. A guide means, in the preferred embodiment a guide hole, is punched into two parts of this border that are opposite each other and, for example on a lengthwise center line such as B—B on FIG. 2a or on a diagonal. Apart from the defined location, these guide holes also have a predetermined diameter and predetermined distance from each other. Then, one of the surfaces of the translucent inside layer is imprinted with a guilloche and/or directly readable information. If a defined direction of the guilloche in relationship to the planned edge of the card is desired, the guideholes can be used to hold the layer in the printing press. When the print is dry the translucent inside layer with its coating foil is inserted into a heatable coating press. The coating press has two guide pins that correspond in diameter and arrangement with the guide holes which allows for an exact alignment of inside layer and coating foil in the coating press. For the coating the translucent layer and its coating foil are pressed together with a pressure of about 75 kp/cm$^2$ and heated to a temperature in the area of 150° to 170° C.

The same coating is accomplished with the non-imprinted transparent inside layer and its coating foil.

A heatable stamping press is used to create the embossed and debossed formations. The matrix designed to carry the layer to be stamped in this press also has guide pins that correspond in size and arrangement to those in the coating press or to the guide holes in the layer, and the stamping die (top die) has two guide borings that permit exact guiding of the stamp press along the guide pins. When inserting the coated translucent layer into the stamping press, the guide holes of the layer are pushed onto the guide pins of the press and the layer with the cover coating is placed onto the matrix that is constructed as a flat ground plate. Then, the heated stamping die, guided by the guide pins, is pressed onto the non-coated surface of the layer, whereby the positive shapes shown in FIG. 2b as a cross section are formed. (These shapes are referred to as being positive here because they will be visible on the finished card as darker areas compared with the parts protruding from the surface.) With the arrangement of guide pins and borings described above, an exactly defined direction of the stamped shapes and the guide holes in the layer can be obtained.

In the same manner negative shapes are stamped into the uncoated surface of the transparent layer that will be complementary to the positive shapes in the translucent layer, i.e. contain the indentations and elevations that correspond to the elevations and indentations in the translucent layer.

In another assembly operation the two coated and stamped layers are inserted into a welding and hot sealing press. This press too contains two guide pins, the dimensions and arrangements of which correspond to the guide holes, and on which the two layers which their opposing shapes are inserted. The guide pins effect a sufficiently desirable alignment of the layers so that the elevations on one can be inserted into the indentations of the other in a form-locking manner. The two layers are then pressed together in the press and heated until they are welded into a monolithic laminate card.

Finally, the edges of the card are cut to the desired size, whereby, preferably, a cutting tool is to be used that is also equipped with guide pins.

A suitable material for the manufacture of the identification card is PVC which is commercially available in suitable thicknesses, with varying amounts of transparency, in different colors and with different mechanical properties. For a tested identification card PVC inside layers with a thickness of 0.2 mm and PVC coating foils with a thickness of 0.1 mm were used. The depth and height respectively of the embossed and debossed formations was 0.1 mm.

It is understood that the described card is only one preferred type which can be adapted in many ways to the given circumstances. For example, it is possible to stamp the embossed and debossed formations as shown in FIG. 2b on the translucent inner layer 27, onto the transparent inner layer 26 and vice-versa. Under transmitted light the frame 23, shown in black in FIG. 2a, as well as the enclosed letters and numbers and the stripe 22 would be lighter than the rest of the card 25, while the area around the sign or image 24 and the edges of the letters, that are drawn in white in the Figure, would be darker then the rest of the card.

Furthermore, there is no need to print the guilloche 31 only onto the areas of the card where neither the sign 21 or the stripe 22 become visible. Rather, the areas with an imprinted guilloche and any other imprinted information could, without drawbacks, cover the areas intended for the sign or image and the stripe.

It is also understood that the described process can be changed in many ways. It is, for example, possible to stamp the layers in such a way that one of them has only indented formations and the other only elevated formations, in which case the sign or image visible under transmitted light would show only lighter or darker areas as compared to the medium brightness of the card. Furthermore, the guilloche can also be imprinted onto the inside surface of the translucent layer or even of the transparent layer. For the coating and the final joining of the two coated and shaped layers the same press can be used. Instead of the pressure welding method described, the individual layers can also be sealed with the aid of hot sealing materials or with a suitable solvent. If the embossed and debossed formations have sharp edges and are deep enough to penetrate each other when the two inside layers are set on top of each other (for which purpose the 0.1 mm described above has proven to be sufficient) and if no special alignment is needed for the sign or image that is visible under transmitted light with regard to printed signs or information or to one of the edges of the card, the guide ways can be dispensed with for the layers as well as for the devices used during the manufacturing process of the identification cards. Finally, it is also understood that the new card does not have to be manufactured individually as described above, but can be made in sheets, whereby the guide holes would be preferably put in between the usable areas of the sheets.

It is believed that the experts could choose the plastic material best suited for any particular purpose and also to set the parameters for an optimal manufacturing procedure, for which reason no further details are given here on purpose.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An identification card comprising:
    at least a first and second plastic layer having different optical properties and having embossed and debossed formations formed thereon, said embossed and debossed formations further comprising complementary, interlocking formations for forming mutually joinable surfaces of said at least first and second plastic layers such that said at least first and second plastic layers are joined to form a monolithic laminate forming an image visible in transmitted light passed through said embossed and debossed formations, said image having different optical properties from the remainder of the card.

2. The identification card according to claim 1, wherein the first plastic layer is a transparent plastic layer and the second plastic layer is a translucent plastic layer so as to form areas of different brightness and wherein said image further comprises said areas of different brightness.

3. The identification card according to claim 1, wherein said second plastic layer is a colored, translucent plastic layer and wherein said image further comprises areas of different color intensity.

4. The identification card according to claim 1, wherein an outer surface portion of each of said first and second plastic layers is provided with an abrasion-proof and mar-proof plastic foil coating.

5. The identification card according to claim 2, wherein the translucent plastic layer further includes a printed guilloche and/or directly readable information formed on an outer surface of said translucent layer.

6. The identification card according to claim 1, wherein the first plastic layer further comprises a translucent plastic layer and the second plastic layer further comprises a translucent plastic layer having a different light transmission characteristic than said first plastic layer so as to form areas of different brightness and wherein said image further comprises said areas of different brightness.

7. The identification card according to claim 1, wherein said second plastic layer further comprises a colored, translucent plastic layer and wherein said image further comprises areas of different colors.

8. The identification card according to claim 6, wherein the translucent plastic layer further comprises a printed guilloche and/or directly readable information formed on a surface of said second plastic layer adjacent said first plastic layer.

9. The identification card according to claim 2, wherein the translucent plastic layer further comprises a printed guilloche and/or directly readable information formed on an outer surface of said translucent plastic layer.

10. The identification card according to claim 7, wherein the translucent plastic layer further comprises a printed guilloche and/or directly readable information formed on a surface of said second plastic layer adjacent said first plastic layer.

11. A method of manufacturing an identification card from first and second plastic layers, each having different optical properties and having guide means formed therein so as to form an image visible in transmitted light which comprises forming complementary, interlocking embossed and debossed formations on said first and second layers via said guide means and mounting said first plastic layer to said second plastic layer whereby an image is created by areas of different brightness.

* * * * *

Disclaimer 4,469,725.—*Paul Fischer,* Uitikon/Waldegg; and *Etienne Ponato,* Wallisellen, Switzerland. IDENTIFICATION CARD. Patent dated Sept. 4, 1984. Disclaimer filed Oct. 7, 1985, by the assignee, FIS Organisation AG.

The term of this patent subsequent to Sept. 30, 1985, has been disclaimed.
[*Official Gazette December 31, 1985.*]